(12) United States Patent
Cao et al.

(10) Patent No.: US 8,055,530 B2
(45) Date of Patent: Nov. 8, 2011

(54) SYSTEM AND METHOD FOR COMPOSITE PRICING OF SERVICES TO PROVIDE OPTIMAL BILL SCHEDULE

(75) Inventors: Rong Z. Cao, Beijing (CN); Wei Ding, Beijing (CN); Shun Jiang, Beijing (CN); Juhnyoung Lee, Yorktown Heights, NY (US); Gregory C. Morris, Beacon Hill (AU); Chunhua Tian, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 353 days.

(21) Appl. No.: 12/040,579

(22) Filed: Feb. 29, 2008

(65) Prior Publication Data

US 2009/0222297 A1    Sep. 3, 2009

(51) Int. Cl.
*G06Q 10/00* (2006.01)
(52) U.S. Cl. ............. 705/7.35; 705/7.28; 705/400
(58) Field of Classification Search ........ 705/7.35, 705/7.28, 400
See application file for complete search history.

(56) References Cited

U.S. PATENT DOCUMENTS

| | | | |
|---|---|---|---|
| 5,987,425 A | 11/1999 | Hartman et al. | |
| 6,226,625 B1 | 5/2001 | Levenstein | |
| 6,381,586 B1 | 4/2002 | Glasserman et al. | |
| 6,526,387 B1 | 2/2003 | Ruffin et al. | |
| 6,526,392 B1 | 2/2003 | Dietrich et al. | |
| 6,703,934 B1 | 3/2004 | Nijman et al. | |
| 6,938,007 B1 | 8/2005 | Iulianello et al. | |
| 6,963,854 B1 | 11/2005 | Boyd et al. | |
| 6,993,494 B1 | 1/2006 | Boushy et al. | |
| 7,092,918 B1 | 8/2006 | Delurgio et al. | |
| 7,133,848 B2 | 11/2006 | Phillips et al. | |
| 7,188,069 B2 | 3/2007 | Hagelin | |
| 7,212,998 B1 | 5/2007 | Muller et al. | |
| 7,213,754 B2 | 5/2007 | Eglen et al. | |
| 7,379,890 B2 | 5/2008 | Myr et al. | |
| 7,493,262 B2 | 2/2009 | Hagelin | |
| 7,680,686 B2 | 3/2010 | Tellefsen et al. | |

(Continued)

FOREIGN PATENT DOCUMENTS

CA    2317332    10/2001

OTHER PUBLICATIONS

PriceIT, Pharmaceutical Pricing Support System from Inpharmation Ltd., 1999-2000.*

(Continued)

*Primary Examiner* — John Hayes
*Assistant Examiner* — Kevin Flynn
(74) *Attorney, Agent, or Firm* — Scully, Scott, Murphy & Presser, P.C.; William Stock, Esq.

(57) ABSTRACT

System and method for service pricing optimization enables analysis of multi-phased, multi-business unit, multi-process, multi-geo/country deal structure with its parts and phases having different pricing implications, and provides a flexible composite pricing schedule optimized for both service provider and receiver by gain and risk sharing. In one aspect, elementary pricing models and pricing parameters are established and a composite pricing model is constructed based on the elementary pricing models and pricing parameters. An optimizer optimizes the composite pricing model to minimize risk and maximize one or more selected criteria. Price is generated using the optimized composite pricing model.

25 Claims, 13 Drawing Sheets

U.S. PATENT DOCUMENTS

| | | |
|---|---|---|
| 2001/0051932 A1 | 12/2001 | Srinivasan et al. |
| 2002/0010673 A1* | 1/2002 | Muller et al. ............... 705/37 |
| 2002/0077835 A1 | 6/2002 | Hagelin |
| 2002/0143681 A1 | 10/2002 | Yen et al. |
| 2002/0165834 A1 | 11/2002 | Delurgio et al. |
| 2002/0188576 A1 | 12/2002 | Peterson et al. |
| 2003/0023567 A1 | 1/2003 | Berkovitz et al. |
| 2003/0046203 A1* | 3/2003 | Ichihari et al. ............. 705/35 |
| 2003/0101146 A1 | 5/2003 | Yeo et al. |
| 2003/0171990 A1 | 9/2003 | Rao et al. |
| 2003/0177056 A1 | 9/2003 | Winther |
| 2003/0225593 A1 | 12/2003 | Ternoey et al. |
| 2004/0073505 A1* | 4/2004 | Wright ........................ 705/36 |
| 2004/0215522 A1* | 10/2004 | Eder ............................ 705/26 |
| 2005/0096963 A1* | 5/2005 | Myr et al. ................... 705/10 |
| 2005/0131791 A1 | 6/2005 | MacMillan et al. |
| 2005/0256778 A1 | 11/2005 | Boyd et al. |
| 2006/0117317 A1 | 6/2006 | Crawford et al. |
| 2006/0122879 A1 | 6/2006 | O'Kelley |
| 2006/0195345 A1* | 8/2006 | Close et al. ................ 705/400 |
| 2006/0247998 A1 | 11/2006 | Gopalakrishnan |
| 2007/0143171 A1 | 6/2007 | Boyd et al. |
| 2007/0214025 A1 | 9/2007 | Jang et al. |
| 2008/0154651 A1 | 6/2008 | Kenefick et al. |
| 2008/0235076 A1 | 9/2008 | Cereghini et al. |
| 2008/0235155 A1* | 9/2008 | Thywissen ................ 705/400 |
| 2008/0312979 A1 | 12/2008 | Lee et al. |
| 2009/0006118 A1 | 1/2009 | Pollak |
| 2009/0037349 A1 | 2/2009 | Katz et al. |
| 2009/0063367 A1 | 3/2009 | Brown et al. |
| 2009/0063369 A1 | 3/2009 | Brown et al. |
| 2009/0144141 A1 | 6/2009 | Dominowska et al. |
| 2009/0210711 A1 | 8/2009 | Moskowitz |

OTHER PUBLICATIONS

"Q2 2005 eSpeed, Inc. Earnings Conference Call—Final", Fair Disclosure Wire, Aug. 5, 2005.*

"HP Expands Network Storage Service Portfolio, Enhances Pay-per-use Solution for Disk Arrays", Business Wire, Jun. 24, 2003.*

* cited by examiner

PRICING MODELS AND PARAMETERS SELECTION

STEP 1: SELECT A PRICING MODEL

PRICING MODEL: [PERFORMANCE ADJUSTED ▼]

FIXED PRICE
PAYMENT PHASING AND SMOOTHING
PERFORMANCE ADJUSTED
UTILITY
FULLY BUSINESS METRIC ALIGNED

STEP 2: SELECT A PARAMETER OF CORRESPONDING PRICING MODEL

PARAMETER: [PROJECT DURATION ▼] — 402

STEP 3: SELECT PARAMETER VALUE TYPE

○ HISTORICAL DATA
● TRIANGLE DISTRIBUTION
○ NORMAL DISTRIBUTION

STEP 4: INPUT 3 VALUE (min, most likely, and max) OF THE PARAMETER

Min: [ 9 ] MONTHS
Node: [ 10 ] MONTHS
Max: [ 11 ] MONTHS

[ ADD ]   [ CANCEL ]

FIG. 4

| PARAMETERS | RATE OF CHANGE | | | NPV IN MILLION | | |
| --- | --- | --- | --- | --- | --- | --- |
| | Min | Most likely | Max | 0 MILLION | 10 MILLION | 20 MILLION |
| NUM. OF TRANSACTION | 1 | 1.75 | 2.5 | -101% | | +100% |
| PROJECT DURATION | 20 | 25 | 30 | -58% | | +59% |
| SAVINGS IN PROCESSES | 0% | 5% | 10% | -43% | | +43% |
| PRODUCTIVITY GAINS | 0% | 3% | 6% | -43% | | +43% |
| CUSTOMER LOSS RATE | 20% | 10% | 5% | -51% | | +31% |
| CUSTOMER GROWTH RATE | 15% | 30% | 45% | -36% | | +44% |
| MARKETING/ADVERTISING | 300 | 400 | 500 | -10% | +10% | |

| PRICING MODEL | METRICS | VALUE | SERVICE PROVIDER GAIN | SERVICE PROVIDER LOSS | % ANNUAL CHANGE | | |
|---|---|---|---|---|---|---|---|
| | | | | | YEAR 1 | YEAR 2 | YEAR 3 ~ |
| FIXED PRICE | FIXED FEE | 2 MILLION $ | | | 100% | | |
| PERFORMANCE ADJUSTED | COMPLETION DATE | 10 MONTHS | +10% | -10% | 100% | | |
| FULLY BUSINESS METRIC ALIGNED | SERVICE REQUEST DURATION | 5 h | +3% | -3% | | 50% | 100% |
| | ENTITLEMENT DRIVEN INCIDENT AVOIDANCE | 80% | +3% | -3% | | 50% | 100% |
| | REMOTE SOLVE RATE | 90% | +3% | -3% | | 50% | 100% |
| | WEB SELF HELP EFFECTIVENESS | 60% | +3% | -3% | | 50% | 100% |
| | TECHNICAL FAULT RATE | 5% | +3% | -3% | | 50% | 100% |
| | NO FAULT INCIDENT RATE | 1% | +3% | -3% | | 50% | 100% |

FIG. 14

SYSTEM AND METHOD FOR COMPOSITE PRICING OF SERVICES TO PROVIDE OPTIMAL BILL SCHEDULE

CROSS-REFERENCE TO RELATED APPLICATIONS

This application is related to the following commonly-owned, co-pending United States patent applications filed on even date herewith, the entire contents and disclosure of each of which is expressly incorporated by reference herein as if fully set forth herein. U.S. patent application Ser. No. 12/040,595, for "SYSTEM AND METHOD FOR GENERATING OPTIMAL BILL/PAYMENT SCHEDULE"; U.S. patent application Ser. No. 12/040,481, for "SYSTEM AND METHOD FOR CALCULATING POTENTIAL MAXIMAL PRICE AND SHARE RATE"; U.S. patent application Ser. No. 12/040,472, for "SYSTEM AND METHOD FOR CALCULATING PIECEWISE PRICE AND INCENTIVE".

FIELD OF THE INVENTION

The present application generally relates to pricing of services and goods, and more particularly to composite pricing that provides optimal bill schedule.

BACKGROUND OF THE INVENTION

Buyers and suppliers of information technology (IT) services today work with a variety of different pricing schemes to meet their individual project and business needs. Historically, the great majority of service contracts were billed on a time and materials basis. However, a recent market and business survey revealed that users and vendors are increasingly moving toward more flexible contract structures built around a combination of fixed-fee/fixed-bid service components and value-based/risk-reward mechanisms based on usage or defined service-level objectives.

Common approaches to pricing include cost-oriented pricing, competitive-oriented pricing, and value-based pricing approaches. In cost-oriented pricing, the seller determines the cost involved in providing a specific service and adds the desired profit margin to calculate price. The cost is set based on the internal cost to deliver the service and/or product plus a target margin on the cost. In competitive-oriented pricing, price is determined with reference to the prices of the competitors.

Value based pricing usually refers to the setting of price as a function of the expected value to be derived from the services and/or products. A set of value drivers in value-based pricing may vary from industry to industry. In a value based approach the price is based on the total value delivered to the client. Internal costs and target margins are only considered to ensure that the value-based price meets or exceeds the planned target margin. Value based pricing can provide greater negotiating leverage and ability to win the contract for services and/or products, and typically results in the higher profit margins. Thus, more and more projects are using value-based pricing model.

Different value-based pricing models focus on different aspects for providing value-based pricing. For instance, part fixed/part risk-reward pricing model is a form of value-based pricing models that links the price to clearly defined business value improvements, for example, economic value to the customer for the goods/services that is provided. This economic value can be measured in additional revenue, cost savings, improved cash flow, inventory turns, etc. The following formulas illustrate some examples of determining value-based price using economic values:

Base Fee+gain sharing on cost savings (e.g., −10% cost savings every year for 3 years);

Base Fee+gain sharing on completion date (e.g., +/−10% depending on defined implementation date);

Base Fee+gain sharing on added value (e.g., link price to efficiency business process improvement);

Base Fee+gain sharing on company level metrics (e.g., link price to corporate level metrics such as ROCE (Return on Capital Employed), ROA (Return on Assets); share price improvement of the client; KPIs (Key Performance Indicators) specified in balanced scorecard, meeting schedule, budget, and/or quality in project delivery; building capability in process and/or technology platform; client satisfaction).

Another example of value-based pricing model is self-funding pricing model. This model considers risks based on phased funding upon attainment of benefits. For example, first phase of work is funded based on the successful attainment of benefit for the next phases of work. Solution financing model provides yet another variation of value-based pricing model that includes complete or partial financing of an appropriate solution. Completely variable pricing is another value-based pricing model and links the price to clearly defined business value improvements and covers the entire project fee plus potential gain sharing based on some metrics. Utility/on-demand pricing is yet another example of value-based pricing model, in the form of "usage-based" feed, that is, price depending on usage of services, outsourced process performance, IT infrastructure usage.

While many IT services firms utilize the value-based pricing models, others have varied pricing determination depending on the state of client's business goals and individual projects. For instance, if client's underlying business goals and maturity of its internal processes are small and have poorly scoped engagements, time and materials pricing is seen as the appropriate pricing model. On the other hand, if the client has well defined projects drawn from previous project experience, fixed-fee pricing is viewed as more appropriate. Among trusted partners, where the responsibilities of each player are clear and agreeable, value-based pricing is preferred since outstanding results can be delivered if done properly.

In practice, deals may incorporate a variety of components and situations resulting in a hybrid deal structure. Thus, it is desirable to have an automated system and method that can take into account the various and hybrid characteristics of a project or business goal and provide an optimal pricing model, for example, that is based on different pricing models for different sets of characteristics found in the overall project or business goal.

Profitability can be extremely sensitive to changes in price. For instance, studies show that given a cost structure typical of large corporations, a 1% boost in price realization yields a net income gain of 12%. A pricing model that considers hybrid characteristics of a project and uses different pricing schemes and further optimizes the ratio of the usage of those different pricing schemes in the pricing model would provide better and more accurate pricing, and result in much improved profit.

BRIEF SUMMARY OF THE INVENTION

Method and system for composite pricing are provided. The method in one aspect may comprise establishing one or more elementary pricing models and one or more pricing parameters, constructing a composite pricing model based on said one or more elementary pricing models and one or more pricing parameters, optimizing the composite pricing model to minimize risk and maximize one or more selected criteria, and generating a price utilizing the optimized composite pricing model. In another aspect, the method may further comprise enabling analysis of one or more attributes associated with the price.

A system for providing composite pricing, in one aspect, may comprise an asset repository providing information associated with a plurality of elementary pricing models and one or more pricing parameters associated with the elementary pricing models. A pricing model selection module may be operable to select one or more elementary pricing models based on one or more project criteria and the information in the asset repository. The pricing model selection module may also build a composite pricing model. A quantifiable metrics selection module is operable to select one or more parameters associated with said selected one or more elementary pricing models used in the composite pricing model. A pricing optimizer module is operable to optimize the composite pricing model to minimize risk and maximize one or more selected criteria and to generate a price utilizing the composite pricing model.

A program storage device readable by a machine, tangibly embodying a program of instructions executable by the machine to perform a method of composite pricing may be also provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 4 illustrates an example of user interface screen shot that may be provided for user interaction in one embodiment of the present disclosure.

FIG. 9 shows a sensitivity analysis example.

FIG. 14 shows an example of a Call Center template.

DETAILED DESCRIPTION

The system and method of the present disclosure in one embodiment provide a pricing model, and enable analysis of multi-faceted, for example, multi-phased, multi-business unit, multi-process, multi-geo/country deal structure or service project with its parts and phases having different pricing implications. The system and method of the present disclosure also provide flexible, composite pricing schedule. The schedule in one embodiment is optimized for both service provider and service receiver by gain and risk sharing, and is based on both cost and value based pricing combination.

Figure 1:
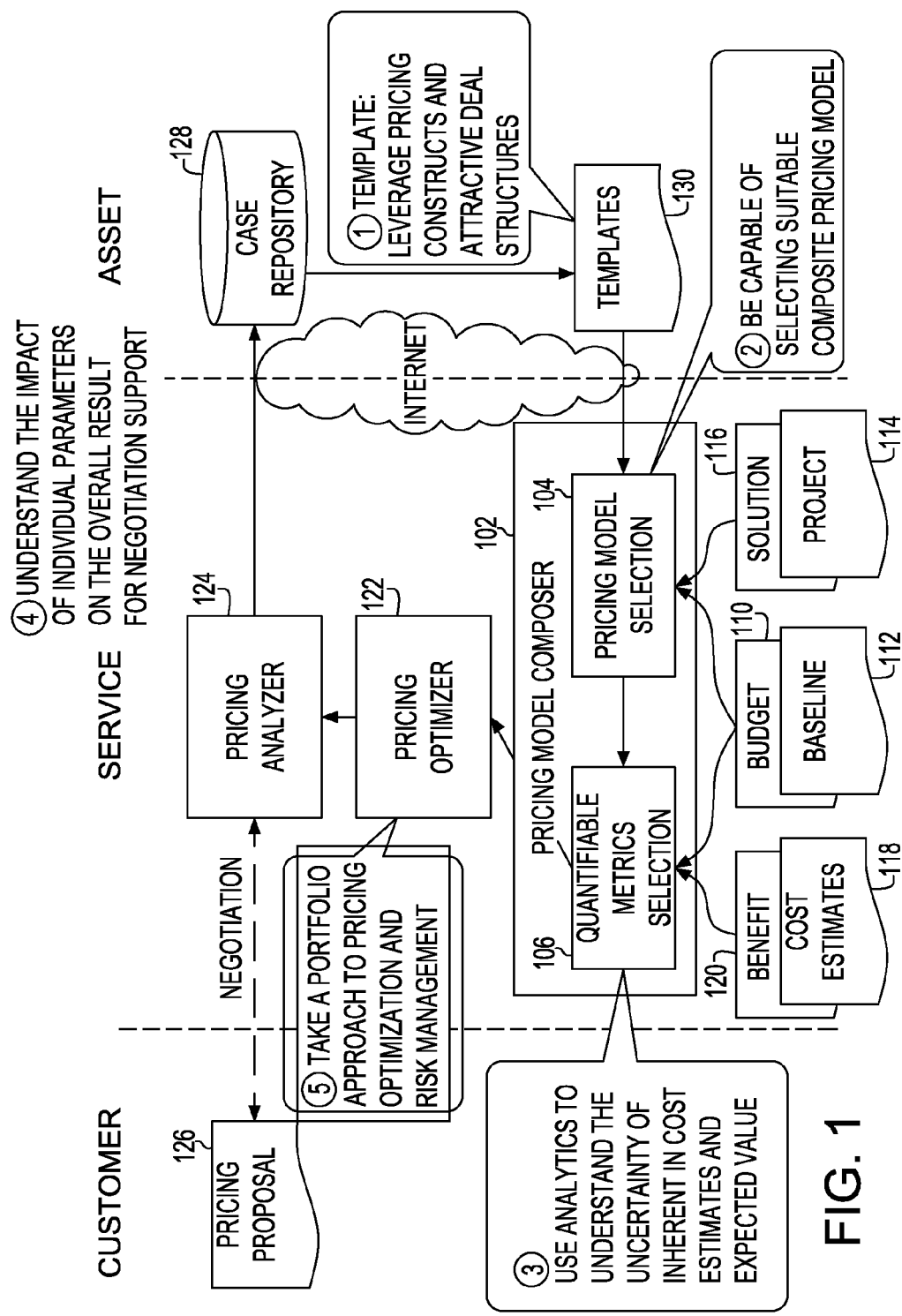
FIG. 1 is an architectural diagram illustrating components of composite pricing of services in one embodiment of the present disclosure.

FIG. 1 is an architectural diagram illustrating examples of system components for providing composite pricing of services in one embodiment of the present disclosure. The various modules shown in FIG. 1 are logical or functional components illustrated as examples to explain the workings of the system of the present disclosure in one embodiment, and may be implemented and run on general and/or special purpose computer or computers, for instance, as software, firmware and/or hardware or like components. A person of ordinary skill in the art will understand that the components need not be divided or modularized only as shown in FIG. 1. Thus, for example, the functional components may be implemented as one unit or as many different units of software, hardware, circuitry or like.

Referring to FIG. 1, a pricing model composer 102 constructs one or more composite pricing models using one or more elementary pricing models selected in pricing model selection module 104, and optimizes the pricing models based on one or more pricing parameters selected in module 106, which in one embodiment include metrics for both cost and value. Parameters refer to variables that define characteristics and behavior of pricing scheme in each pricing model, and are used to configure a pricing model. Parameter values can be input to the pricing model. The pricing model composer 102 utilizes an asset repository 128 and templates 130 to efficiently construct the composite pricing models.

In one embodiment, templates 130 of pricing models may be composed by pricing experts and/or by using historical data from previous deals. Templates of pricing models have their parameter values set as default values based on historical data and other reasoning that are configured for cases. Templates of various pricing models are grouped together for use in different deal cases. The information on the cases and groups of pricing model templates for the cases may be stored in a repository. For instance, the Case Repository 128 can be a database, which allows search for templates for deal cases. While the present disclosure does not constrain the structure and enabling technologies for the case repository and templates, they can be network-based systems using representation languages, e.g., Web-based repository storing templates represented in XML or HTML, etc. Case Repository 128 may be also referred to as Asset Repository. Generally, administrators may manage the repository 128. A user may update the data in the repository, for instance, add new templates, remove templates and/or update templates.

Templates 130 may include one or more pricing models, for example, elementary pricing models, and default values for the parameters associated with the pricing models. As an example, a template may be a composition of several elementary pricing models. Generally, different solutions have corresponding templates. For instance, call center solution has a corresponding call center template, outsourcing solution has a corresponding outsourcing solution template, customer relationship management solution has a corresponding customer relationship management template, etc. An example of a Call Center template is shown in FIG. 14. This template shown in FIG. 14 has composite of three pricing models, fixed price, performance adjusted, and fully business metric aligned. The template also shows parameters and values associated with those three pricing models.

Examples of elementary pricing models include but are not limited to, time and materials based, fixed fee, payment phasing/smoothing, performance adjusted, share of benefits adjusted, utility-based fee, fully business metric aligned, etc. Briefly, time and materials elementary service pricing model is tied to resource usage and may include "not to exceed" conditions. Examples of such conditions may include but are not limited to, "the FTE level in 2008 not to exceed 100," "total annual FTE level not to exceed 200," "total consulting cost not to exceed 200% of the total software and hardware cost combined." FTE refers to Full Time Equivalent, a unit for measuring work effort in service projects or a generic unit for Head Count. This pricing model may be suitable for situations, in which the work effort is unknown, business case is unknown or not knowable or not discoverable, or the scope of deal structure is unclear or highly subject to change or volatility. Parameters such as FTE, skill based rates, software and hardware involved, may be used in the time and materials elementary service pricing model.

Fixed price based elementary pricing model is tied to a specific deliverable or deliverables, the scope of the deal structure that does not vary according to work effort or other factors, or combinations thereof. Fixed price based elementary pricing model may be appropriate for cases in which work effort can be fairly accurately estimated, the scope of the work or project is clearly defined, and/or future expenditures are predictable. A parameter such as profit margin is used in this pricing model. For example, a desired level of the parameters may be given as input; the pricing model may output the expected level of the parameters for the selected scheme after optimization.

Payment phasing/smoothing pricing model works with payment installments, projects divided into multiple phases in which subsequent project phases may depend on the degree of success of the previous phases. This model may be fitting for cases in which there is a promise of early returns, client funding is not immediately available, and/or imminent kick-off is desired or required. A parameter such as phase funding is used in this pricing model. Desired level of the parameters may be provided as input; the pricing model outputs the expected level of the parameters for the selected scheme after optimization.

Performance adjusted pricing model places a percentage of base fees at risk and links the remainder to clearly defined deliverables, milestones or service level agreements. This model may be suitable for cases in which work effort can be fairly accurately estimated, the scope of work and tasks is clearly defined, and/or client is seeking to mitigate delivery risks. Parameters such as deliverables, milestones, service level agreements, quality measures, project duration, budget, client satisfaction, capability building may be used in this pricing model. Desired level of the parameters may be provided as input; the pricing model outputs the expected level of the parameters for the selected scheme after optimization.

Share of benefits adjusted pricing model places a percentage of base fees at risk and links the remainder to clearly defined business value improvements. This model may be befitting for cases in which there is a clear point-of-view on business benefits and/or future expenditures are somewhat predictable. Parameters such as percentage of client's net revenue, cost savings, pre-tax income (PTI), gross profit (GP), payback period, internal return rate (IRR) may be used in this pricing model. Desired level of the parameters may be provided as input; the pricing model outputs the expected level of the parameters for the selected scheme after optimization.

Utility based pricing model describes pricing in the form of usage-based fee, depending on usage of services, outsourced process performance, IT infrastructure usage, etc. Utility based pricing model may be appropriate for cases in which the historical or comparative volumes are known, and/or future volumes are unpredictable or highly variable. Parameters or factors such as volume of transaction, size of central processing unit (CPU), usage of service, outsourced process performance, IT infrastructure usage, time-based licensing (TBL), perpetual licensing factors may be used in this pricing model. Desired level of the parameters may be provided as input; the pricing model outputs the expected level of the parameters for the selected scheme after optimization.

Elementary service pricing model that is fully business metric aligned is linked to clearly defined business value improvements and covers the entire project fee and gain sharing based on an agreed upon business metrics. This model may be suited to cases in which there is a clear point-of-view on business benefits, output can be directly linked to business metrics, and/or business metrics are tracked. Parameters or factors such as business growth, service level agreements, cycle time, return on capital employed (ROCE), return on assets (ROA), business process improvement, service request duration, entitlement driven incident avoidance, remote solve rate, Web self help effectiveness, freight cost, total parts usage cost, technical fault rate, no fault incident rate may be used in this pricing model. Desired level of the parameters may be provided as input; the pricing model outputs the expected level of the parameters for the selected scheme after optimization.

Referring to FIG. 1, pricing model selection module 104 may select one or more elementary pricing models based on one or more factors or criteria associated with the deal structure such as budget 110, baseline 112, project type 114 and desired solution or benefit 116. Parameter selection module 106 selects various pricing parameters using analytics to understand the uncertainty inherent in cost estimates 118 and expected value 120. For example, consider a scenario in which the pricing model selection module 104 selected a time and material model as one of the elementary models for pricing composition. The metrics selection module 106 calculates or determines the uncertainty of metrics, i.e., parameters, of the time and material-based pricing, i.e., the uncertainty in the cost estimation of the pricing model. The metrics selection module 106 may determine the uncertainty based on historical data or user input. The metrics selection module 106 identifies all the parameters of the model—FTE, work scope, staffing, rates, etc. As an example, the metrics selection module 106 may identify the parameters by identifying user's selection of pricing model and retrieving parameters associated with that pricing model from parameter database. Another way to identify the parameters is to use the template selected and imported for the solution. A template contains pricing model identifications and associated parameters. If the module 104 also selected another elementary model, e.g., fixed pricing for a phase of the project, the metrics selection module 106 identifies parameters for this model, but does not ask the user to provide the same parameters value again, since the parameters are common to both models. Generally, pricing models have associated parameters. The system and method of the present disclosure may collect and store many parameters and link them to respective pricing models. When a user or the system selects the elementary pricing models, for instance, in 104, the corresponding parameters associated with the selected pricing model or models may be listed for a user to select and input values.

In one embodiment, pricing model selection module 104 may automatically evaluate the client situation and the requirements for success to select the most appropriate deal type. In another embodiment, a user may manually select and provide the selected model. Example of the factors considered in selecting the pricing model is shown in Table 1. Table 1 illustrates an overview of each deal type, which for example, may be used as a reference guide during the evaluation process. For automatic selection process, a series of if-then rules or like can be implemented to automatically determine the appropriate pricing model based on the specific client situation, description and requirements for success.

TABLE 1

| Pricing Models | Client Situation | Description | Requirements for Success |
| --- | --- | --- | --- |
| Time and Materials | Scope unclear | Pricing tied to resource usage | Tight project management from the client |
| Fixed Price | Wants delivery guarantee | Pricing tied to deliverables or scope | Accurate work effort estimate |
| Payment Phasing | No immediate funding | Timing of payments linked to benefits | Client pays risk premium |
| Performance Adjusted | Mitigate delivery risk | Some fees linked to delivery performance | Client pays for financing |
| Share of Profits Adjusted | Wants "skin in the game" | Some fees linked to business value change | Business case can afford financing |
| Utility | Wants variable costs | Pricing linked to usage of services | Scope is clearly defined |
| Fully Business Metric aligned | Complete benefits-focused | Pricing linked entirely to benefits | Client hands over some control |

Pricing optimizer 122 computes optimal bill schedule, for example, by using the defined composite pricing model and considering one or more constraints. One or more constraints may include but are not limited to, budget and profit margin. Pricing optimizer 110 may maximize one or more desired factors or criteria, for example, benefits and/or rewards such as client benefit, customer satisfaction and provider profit, while minimizing one or more risks, etc, and takes a portfolio approach to pricing optimization and risk management. Examples of risks minimized may include but are not limited to, risks associated with IT (system failure, malfunction, etc.), security (security failure, hacker attacks, etc.), finance (cash flow problems), resources problems in workforce demand and supply), global workforce (communication problem, culture barrier, etc.), third party participation (legal issues in contract, etc.).

Pricing analyzer 124 enables business case analyses for various what-if scenarios for understanding potential benefit and risk of alternative pricing options, and/or sensitivity analyses for understanding the impact of parameter value changes on overall result, for instance, for negotiation support. For example, negotiations to reach an agreement on deal structure between client and provider can utilize different pricing structures produced by varying the parameters. Pricing analyzer 124 also may evaluate the risk of changing all the variables at the same time while introducing probability distributions for each variable, for instance, utilizing simulation methods such as Monte Carlo simulation. Thus, pricing analyzer 124 can provide the impact of individual parameters on the overall result, which can then be used for negotiation support, for instance, for reaching an agreement with a pricing proposal 126.

Figure 2:
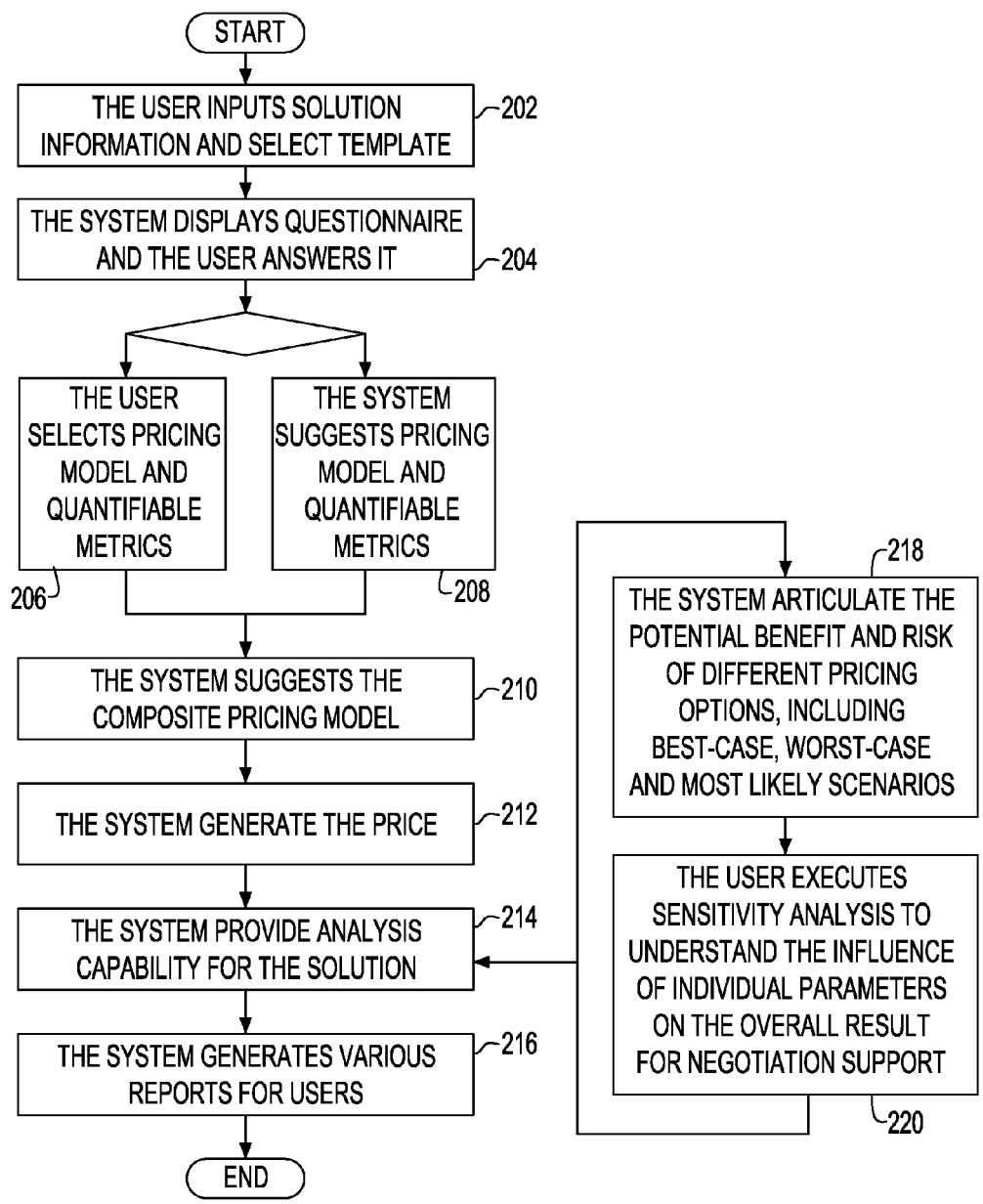
FIG. 2 is a flow diagram illustrating composite pricing of services in one embodiment of the present disclosure.

FIG. 2 is a flow diagram illustrating composite pricing of services in one embodiment of the present disclosure. At 202, a user may input solution information and select one or more templates. Alternatively or additionally, the information may be automatically selected and retrieved, for example, from a repository, database or like, or another computer system or like, storing or in possession of such information. Generally, the solution may indicate the service the contract would require the service provider to deliver. For example, the information on the solution here may include what is needed to calculate the cost and value of the solution, which may include the work scope, work effort, client and project information—the industry and sector of the client, the continent and countries included in the scope, desired project structure, timeline, etc. Templates as explained above may include elementary pricing models with their parameters set based on selected reasoning to make the deal attractive.

At 204, a user may be prompted with questions to which the user inputs answers with information on solution. This information may also be obtained automatically from a source such as a repository, database or like, or another computer system or like storing or in possession of such information. At 205, a user may select appropriate pricing model, for instance, by considering various criteria such as those shown in Table 1, and parameters. Alternatively, or additionally at 208, one or more appropriate pricing models and parameters may be automatically selected and suggested. At 210, a composite pricing model is suggested, which may comprise one or more selected pricing models. At 212, the price is generated using the composite pricing model. For example, the system and method of the present disclosure uses a pricing optimizer and generates a bill schedule. At 214, analysis capability for the desired or requested solution is provided. After the composite pricing model is determined for a solution, a user may analyze the pricing model.

Figure 13:
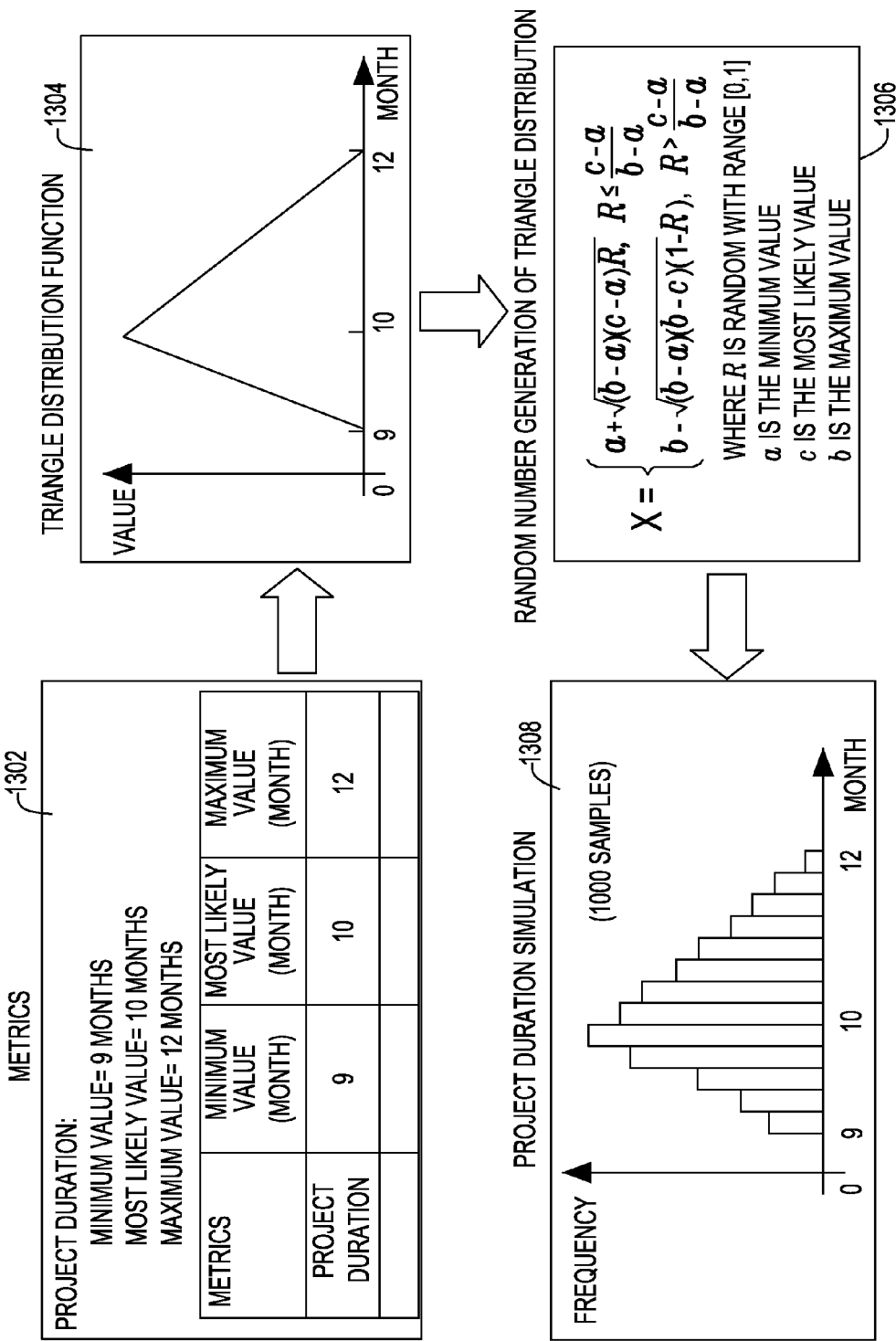
FIG. 13 shows an example of metrics and its probability distribution.

Examples of forms of analysis may include, but are not limited to, what if scenario analysis, sensitivity analysis, and Monte Carlo simulation. Sensitivity analysis is useful in understanding the variables' influence on final output, i.e., the impact of parameter value changes on overall result. What-if scenarios can provide an understanding of potential benefit and risk of alternative pricing options. Such information may be used, for instance, for negotiation support. Monte Carlo simulation may be utilized to evaluate the risk of changing all the variables at the same time while introducing probability distributions for each metrics. Thus, for instance, at 218, a pricing analyzer (FIG. 1, 124) may articulate potential benefit and risk of different pricing options, including best-case, worst-case and most likely scenarios. Each metric has probability distribution. For example, triangle distribution has minimum, most likely, and maximum values. An example of metrics and its probability distribution is shown in FIG. 13. The metrics (parameters) and their value 1302 may be obtained from the information shown in FIG. 4, for instance, from user input values. Referring to FIG. 13, the triangle distribution is used as an example. Based on the minimum value, most likely value and maximum value of a metric, the triangle distribution function 1304 and random number generation formulation 1306 can be generated. Random Number Generation 1306 generates a plurality of static random numbers for triangle distributions, for example run n=1000 samples of the composite pricing model. Reference item 1308 shows the simulation result with 1000 samples, which can be used as input for simulation analysis, for instance, shown in FIG. 10. The net present value of the bill schedule generated using the pricing optimizer, may include the best case, worst case and most likely case. Referring back to FIG. 2, as shown at 220, sensitivity analysis also may be executed to understand the influence of individual parameters on the overall result, for instance, for negotiation support. At 216, various reports may be generated.

Figure 3:
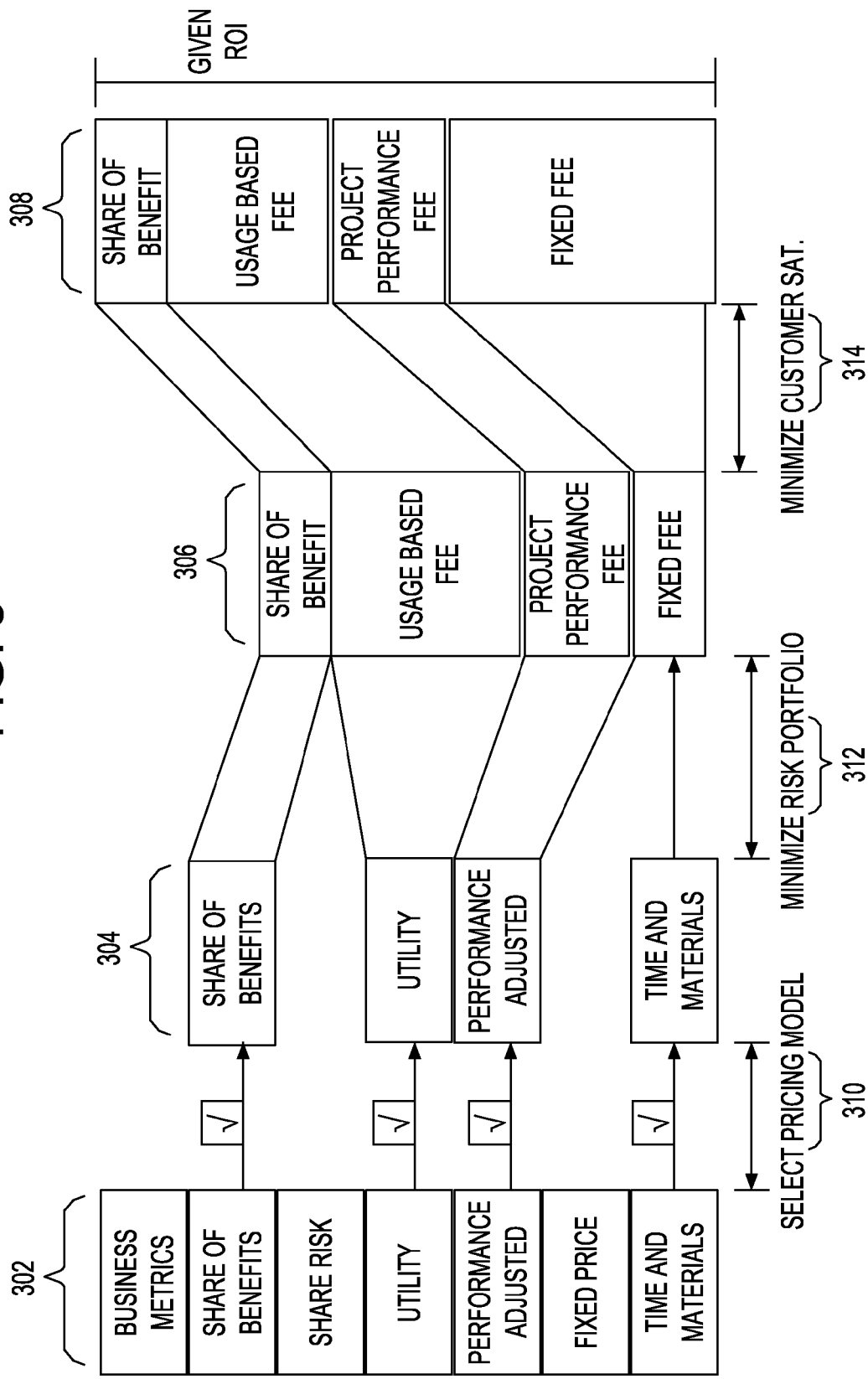
FIG. 3 is a diagram illustrating composite pricing model optimization in one embodiment of the present disclosure.

FIG. 3 is a diagram illustrating composite pricing model optimization in one embodiment of the present disclosure. A user or an automated process selects one or more appropriate models 304 that fit the characteristics of a project or business goal from a set or list of pricing models 302. In the example shown in FIG. 3, share of benefits, utility, performance adjusted, and time and materials pricing models are selected from a group of different pricing models shown at 302 to form a composite pricing model 304 for a given project. Optimization algorithm or like is used to minimize the risks associated with using the selected pricing models 304 for the given project. The result of this optimization at 306 tells the proportion of the selected models that should be utilized in the composite pricing model in order to minimize the risks or other like criteria involved with the pricing of the overall project. This risk-minimized composite pricing model 306 is again optimized, to maximize the benefits or rewards or other like criteria, for example, customer satisfaction. A composite pricing model shown at 308 results, optimized for minimum risk and maximum benefit. The entire process of selecting appropriate models 310, minimizing risk portfolio 312, and maximizing benefits or rewards 314 may be performed automatically or substantially automatically using a computer system or processor, for instance. A user interface software or system may be provided to aid the user in interacting with the system, for instance, for inputting variables such as selected models, parameters, and also for presenting reports and analyses.

FIG. 4 illustrates an example of user interface screen shot that may be provided for user interaction. A user may, for example, choose a pricing model by selecting a solution provided by the pricing model. For instance, a user may specify a pricing model and parameters as shown at 402. A user may also select parameter value type and values such as minimum, mostly likely and maximum values. The input values may be used for pricing analysis as described with reference to FIG. 13. In another embodiment, rather than directly selecting a pricing model, a user may select a desired solution. The system may then automatically list one or more pricing models that provide that solution. The pricing model is maintainable and can be described with more detailed parameters as shown in FIG. 4. Any other method or means for choosing appropriate pricing models and parameters for a given project or deal type may be used.

Figure 5:
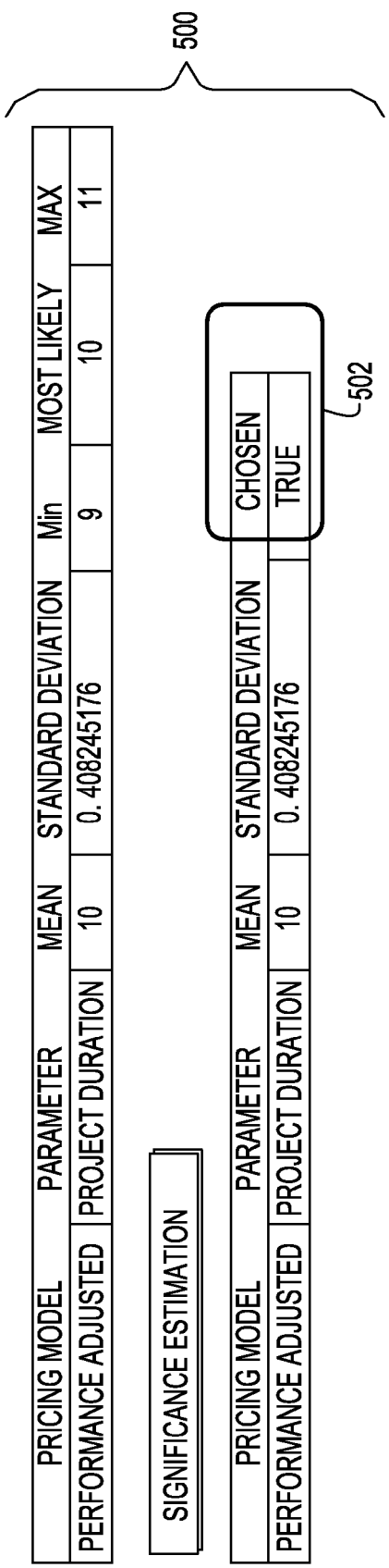
FIG. 5 shows another example of user interface object for allowing user interaction.

FIG. 5 shows another example of a user interface object that enables user interaction. With this object 500, a user may choose the parameters for use in the pricing model for determining the price. For example, shown at 502, the performance adjusted pricing model, project duration parameter, mean value of 10 and standard deviation value were chosen by a user. An internal algorithm, for example, may estimate the significant parameters automatically. Significance estimation is a process that screens the parameters and evaluates whether the parameter is significant. For example, a parameter such as the project duration whose deviation value is large (e.g., 1 month~100 months) may indicate that the project duration is highly uncertain. Selecting and using such parameters may be risky for the pricing model. Therefore, an automatic algorithm may recommend against using such parameters. A user may further revise the options based on the significance estimation. The number of parameters that can be used is not constrained in one embodiment.

The following equation is an example of the optimization model for determining significance estimation.

$$\text{Max} \frac{\sum_{i=1}^{n} x_i \times \text{Mean}(Parameter_i)}{\sqrt{\sum_{i=1}^{n} x_i \times SD(Parameter_i)^2}}$$

$$s.t. \quad x_1, x_2, \ldots, x_n \in \{0, 1\}$$

Mean( ) is a function to calculate the mean of parameter i, SD( ) is a function to calculate the standard deviation of parameter i, $x_i$ is a kind of Boolean variable to represent whether the parameter i is significant or not.

As an example, a pricing model of the present disclosure in one embodiment may assume the following for simplicity and for explanation sake:

1. There are four types of fee in the model, including fixed fee, performance adjusted, utility, and share of benefit adjusted. In fact, the research framework is similar if there are more types for the fee that can be grouped into fixed fee and variable fee.

2. The variable fee is paid in one period after the solution is implemented to avoid the problem of compound interest.

3. There are no explicit correlations among the variable fees. Actually, more usage leads to more benefit and better performance.

4. For each variable fee, its formulation is a proportional function. For example, the usage fee function is: u=k*usage, where k represents some proportional value. In this example variable fee model, the fee is a function of usage, and the formula states that the fee increases linearly to the increase of usage. In this linear function k represents a constant, which decides the degree of the increase (or decrease). This linear function is an embodiment of the variable fee model. There may be various different models, including non-linear functions.

In one embodiment of the present disclosure, a two-stage pricing model is introduced to solve a pricing problem reversely, to decide the proportion among the variable fee first and then the proportion of fixed fee as well as the other variable fees. At the first stage in one embodiment, the proportion of the performance fee, benefit fee and usage fee is solved to minimize the total risk of the variable fee, since the risk of the variable fee should be minimized if the minimization of total risk of the charge is expected. At the second stage in one embodiment, based on the customers' satisfactory and the providers' risk affordance, the proportion of the fixed fee and the variable fee can be inferred. Combined with the solution of the variable fees in the first stage, all the proportion of the four charges are obtained.

Stage 1. Assume the proportion of the performance fee, benefit fee and usage fee is p, b, u respectively. The data of the performance, benefit and usage can be gathered from the history or users' experience. Assume the mean and standard deviation of the data is $m_p$, $m_b$, $m_u$ and $\sigma_p$, $\sigma_b$, $\sigma_u$. Then the risk that performance fee brings to the whole charge is $$\left(\frac{p}{m_p}\right)^2 \sigma_p^2,$$

so the total risk of the variable fee is the sum of the three fee's risk. The problem can be written as:

$$\min \left(\frac{p}{m_p}\right)^2 \sigma_p^2 + \left(\frac{b}{m_b}\right)^2 \sigma_b^2 + \left(\frac{u}{m_u}\right)^2 \sigma_u^2 \quad (1)$$

$$s.t. \quad p + b + u = 1$$

Using Lagrange algorithm, equation 1 can be solved:

$$\frac{\partial L}{\partial p} = 2p\left(\frac{\sigma_p}{m_p}\right)^2 - \lambda = 0 \quad (2)$$

$$\frac{\partial L}{\partial b} = 2b\left(\frac{\sigma_b}{m_b}\right)^2 - \lambda = 0$$

$$\frac{\partial L}{\partial u} = 2u\left(\frac{\sigma_u}{m_u}\right)^2 - \lambda = 0$$

Then the proportions of the three variable fees are:

$$p_0 = \frac{BC}{AC+BC+AB} \qquad A = \left(\frac{\sigma_p}{m_p}\right)^2 \quad (3)$$

$$b_0 = \frac{AC}{AC+BC+AC} \quad \text{where} \quad B = \left(\frac{\sigma_b}{m_b}\right)^2$$

$$u_0 = \frac{AB}{AC+BC+AB} \qquad C = \left(\frac{\sigma_u}{m_u}\right)^2$$

Then the standard deviation of the variable fee is:

$$\sigma = \sqrt{\left(\frac{p_0}{m_p}\right)^2 \sigma_p^2 + \left(\frac{b_0}{m_b}\right)^2 \sigma_b^2 + \left(\frac{u_0}{m_u}\right)^2 \sigma_u^2} \quad (4)$$

Stage 2. For a specific solution project, the customer has his own judgment of the value, and he is clear about his satisfactory level when charging different amount with different fees. So we can get these data by interviewing them, from which we can calculate the elasticity of satisfactory to the charged fee. Assume the customers' satisfactory is S and the relative fee is $F_0$ when charging all by fixed fee, the elasticity of satisfactory is $E_p$, $E_b$, $E_u$, the risk affordance of the providers is R, which can be described as the money amount that the provider is willing to lose at 5% possibility level.

From the satisfactory view, one dollar increase of fixed fee will equal $$\frac{E_f}{E_p}, \frac{E_f}{E_b}, \frac{E_f}{E_u}$$

dollar increase of performance fee, benefit fee and usage fee. Then one dollar of fixed fee equals to $$r = p_0 \frac{E_f}{E_p} + b_0 \frac{E_f}{E_b} + u_0 \frac{E_f}{E_u}$$

increase of the whole variable fee based on Stage 1. Assume that the proportion of fixed fee is f, then the total fee can be charged at certain satisfactory level is $F_0 f + rF_0(1-f)$.

Then next focus is on the solution provider. The risk of the provider is $rF_0(1-f)\sigma$, which should be less than the provider's risk affordance. As the customer prefers more variable fee, then the optimal solution should be maximize the variable fee $rF_0(1-f)$. Therefore, the variable fee should be $$\frac{E}{\sigma},$$

and the proportion of the fixed fee can be consequently deducted.

Combined with the solution of Stage 1, it is concluded that:

$$F = F_0 - \frac{R}{r\sigma}; \quad P = \frac{R}{\sigma}p_0$$

$$B = \frac{R}{\sigma}b_0; \quad U = \frac{R}{\sigma}u_0$$

Customer satisfaction analysis may utilize Analytical Hierarchy Process (AHP) developed by Thomas Saaty. AHP provides a proven, effective means to deal with complex decision making and can assist with identifying and weighting selection criteria, analyzing the data collected for the criteria and expediting the decision-making process. In the present disclosure in one embodiment, AHP method may be utilized to discover customer's preference on pricing models.

The pricing optimization algorithm described above is shown as an example, and the method and system of the present disclosure is not limited to using that model only. Rather, a person of ordinary skill will appreciate that other optimization models may be formulated and used.

Figure 6:
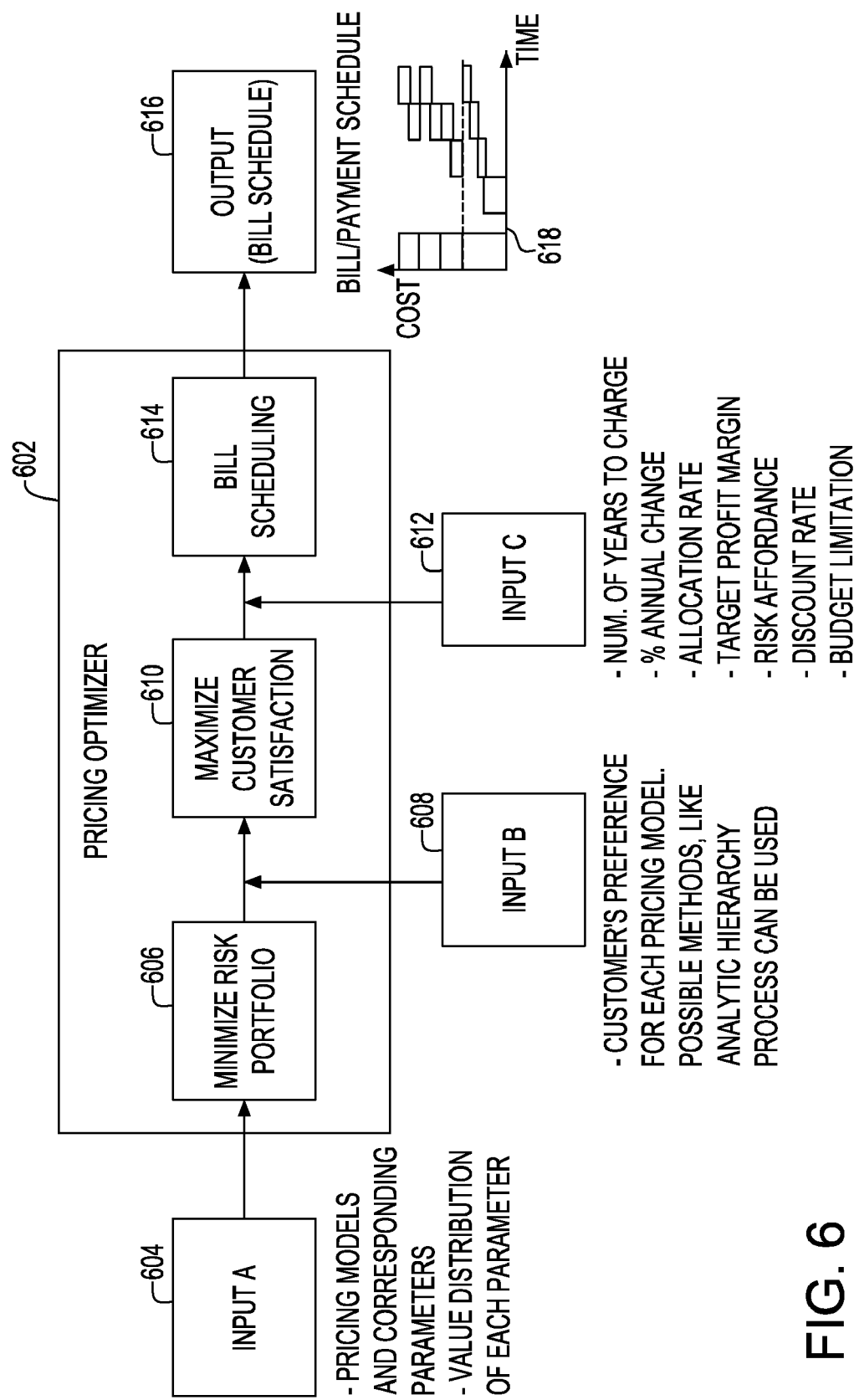
FIG. 6 shows pricing optimizer in more detail in one embodiment.

FIG. 6 shows a pricing optimizer in more detail in one embodiment. A pricing optimizer 602 (also shown as 122 in FIG. 1) receives as input 604 one or more selected pricing models (e.g., elementary pricing models), corresponding parameters, and value distribution of each parameter. The optimizer 602 minimizes risk portfolio at 606. Using additional input 608, the optimizer 602 further maximizes customer satisfaction at 610. Additional input 608 may include customer's preference for each pricing model. Methods such as Analytic Hierarchy Process may be used to obtain customer preferences. The optimizer 602 then may generate bill scheduling 616 (also referred to as price or pricing) at 614 using input values 612 such as the number of years to charge, target profit margin, start date, end date and allocation rate for each pricing model, risk affordance, and discount rate. Those input values are listed herein as examples. A person of ordinary skill will understand that one or different combinations of the listed parameters, or additional parameters may be used to create a bill payment schedule at 616. An example of the bill payment schedule 618 is shown in detail in FIG. 12.

Figure 11:
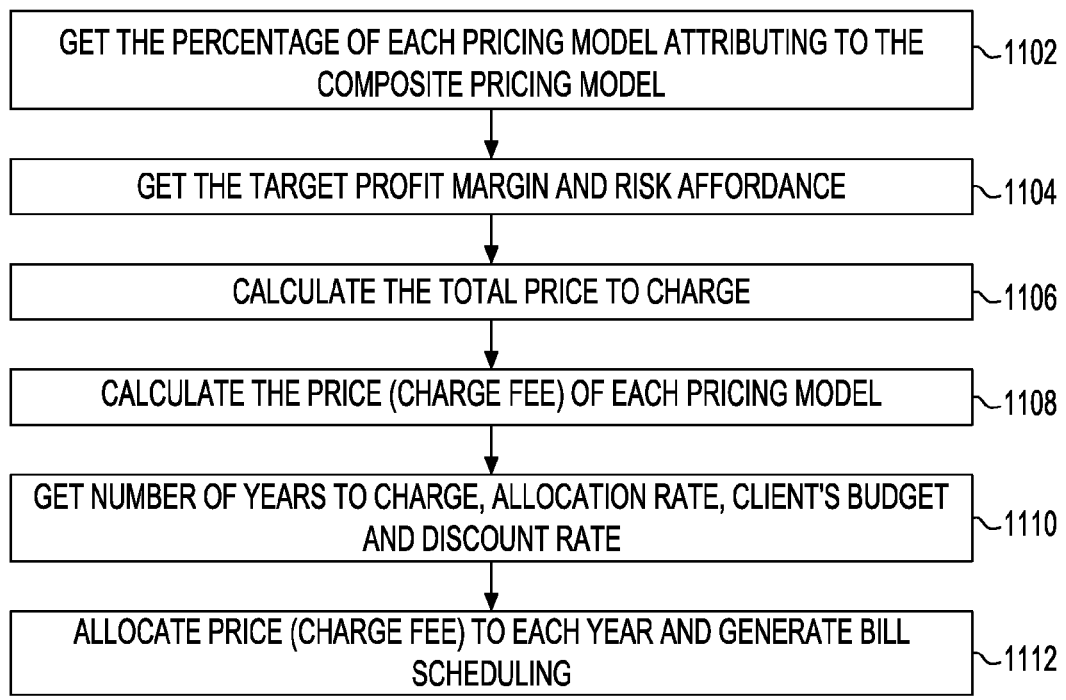
FIG. 11 is a flow diagram illustrating a bill scheduling method in one embodiment of the present disclosure.

FIG. 11 is a flow diagram illustrating a method of generating bill schedule in one embodiment of the present disclosure. At 1102, the percentage of each pricing model used in or attributing to a composite pricing model is retrieved. This percentage, for example, is obtained from a pricing optimizer shown at 122 in FIG. 1, which optimized the model composed in the pricing model composer also shown at 102 in FIG. 1. Any other method may be used to determine the percentage of each pricing model from a composite model. As an example, if a composite model comprises fix fee, performance adjusted, and utility pricing models, the percentage or ratio of each pricing model that attributes to the composite model is determined; for instance, fix fee 50%, performance adjusted 10%, utility 40% (or ratio of 5:1:4, respectively). As another example, referring to the composite model 308 shown in FIG. 3, the percentages of share of benefit, usage based fee, project performance fee, and fixed fee would be obtained.

Referring to FIG. 11, at 1104, the target profile margin and risk affordance values are obtained, for example, from a user as user input. Alternatively or additionally, the data may be retrieved from a repository or knowledge base. At 1106, the total price to charge is determined, for instance, based on the pricing optimizer's computations. At 1108, the price or amount of charge from each pricing model is determined. For example, if the total price is determined to be 1 million USD at step 1106, the amount of charge attributed to each pricing model is the fraction of the composite model that each pricing model contributes (e.g., as determined at step 1102) multiplied by 1 million USD. Using the above composite model example that comprises 50% fix fee, 10% performance adjusted, and 40% utility, the amount of charge attributed to each pricing model respectively is 500K USD, 100K USD, and 400K USD.

At 1110, the number of years to charge, allocation rate, client's budget limit and discount rate are determined, for example, from user input, available data or knowledge base, or additional computation. Example values obtained at 1110 associated with the above composite pricing model example are shown in Table 1. Table 1 illustrates examples of allocation rates, in which the number of years to charge is 4, discount rate is 10%.

TABLE 1

|  | Y1 | Y2 | Y3 | Y4 |
|---|---|---|---|---|
| Fix Fee | 50% | 30% | 20% |  |
| Performance adjusted |  | 100% |  |  |
| Utility |  |  | 50% | 50% |

Referring to FIG. 11, at step 1112, price or charge fee is allocated to each year, which produces bill scheduling.

Figure 12:
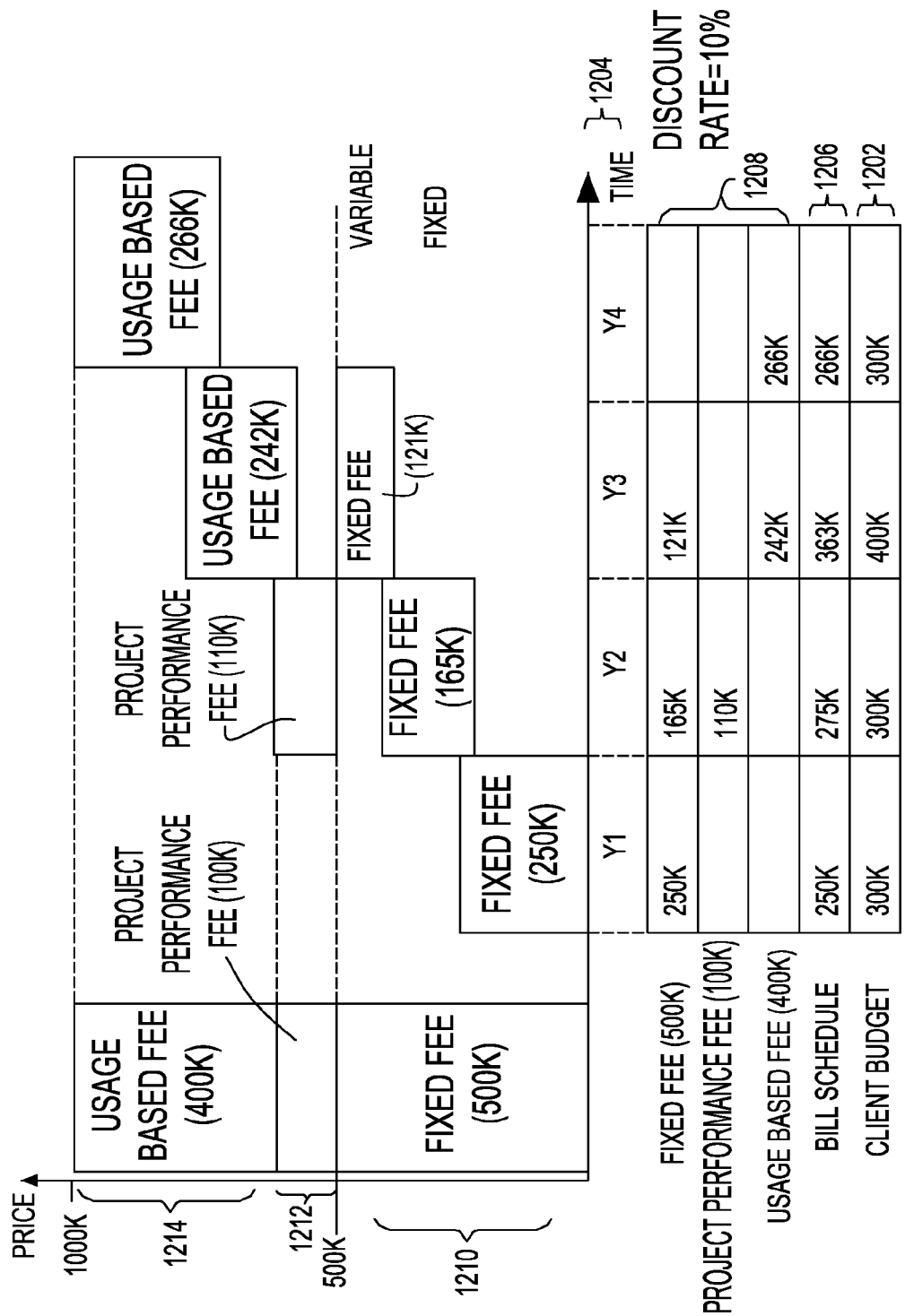
FIG. 12 illustrates an example of a bill schedule in one embodiment of the present disclosure.

The bill schedule shown as an example in FIG. 12 illustrates the amount to charge determined based on the pricing model optimizer of the present disclosure, during different time periods and considering factors such as client budget over the time duration. In this example, based on the client budget 1202 determined over four year period 1204, and considering discount rate of 10%, bill schedule 1206 is determined according to the optimized composite pricing model. Illustratively, fixed fee 1210, project performance fee 1212, and usage based fee 1214 are allocated over the determined time period that meets the client budget (also shown at 1208).

Figure 7:
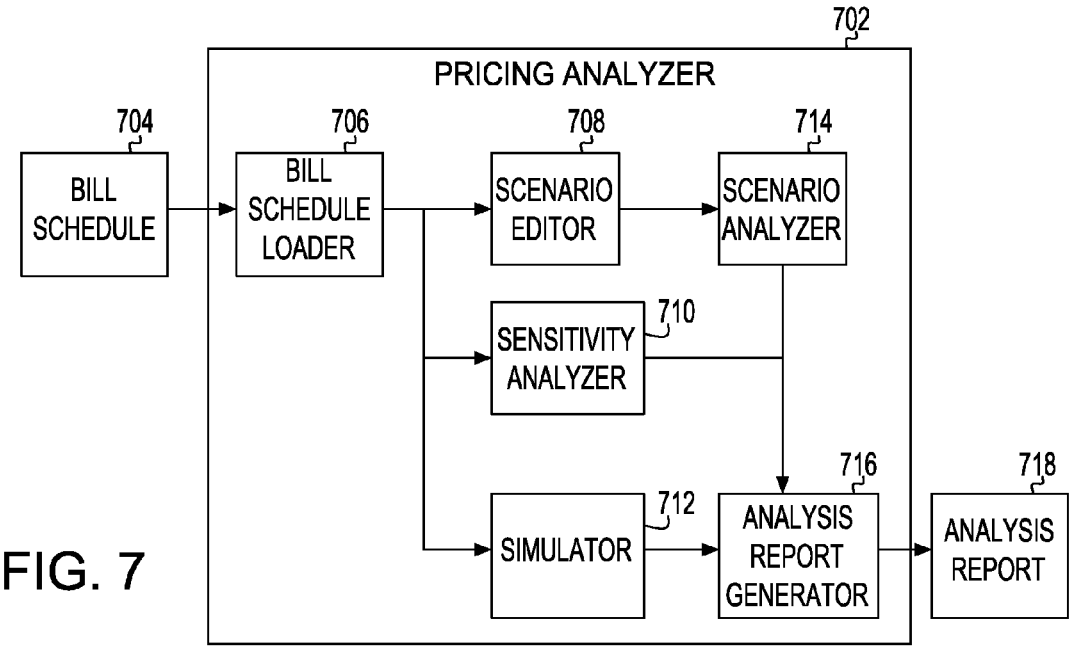
FIG. 7 illustrates a pricing analyzer in more detail in one embodiment.

FIG. 7 shows a pricing analyzer in more detail in one embodiment. A pricing analyzer 702 (also shown at 124 in FIG. 1) uses bill schedule loader 706 to load as input bill schedule 704. A bill schedule is defined as a configuration of one or more pricing models over time, which when taken as a whole, represents a satisfactory cost or payment for a business solution. An example was described with reference to FIG. 12. A scenario editor 708, a sensitivity analyzer 710, and a simulator 712 analyze the bill schedule 704 to make one or more business decisions. The scenario editor 708 defines scenarios and the scenario analyzer compares different scenarios. The sensitivity analyzer 710 can determine the effect on the overall bill schedule by changing one metrics value at a time. Based on the sensitivity analysis, it is easy to identify critical metrics of pricing models and how their variability impacts the result. The simulator 712 can determine the effect of changing all the metrics value at the same time while introducing probability distributions for each metrics.

Figure 8:
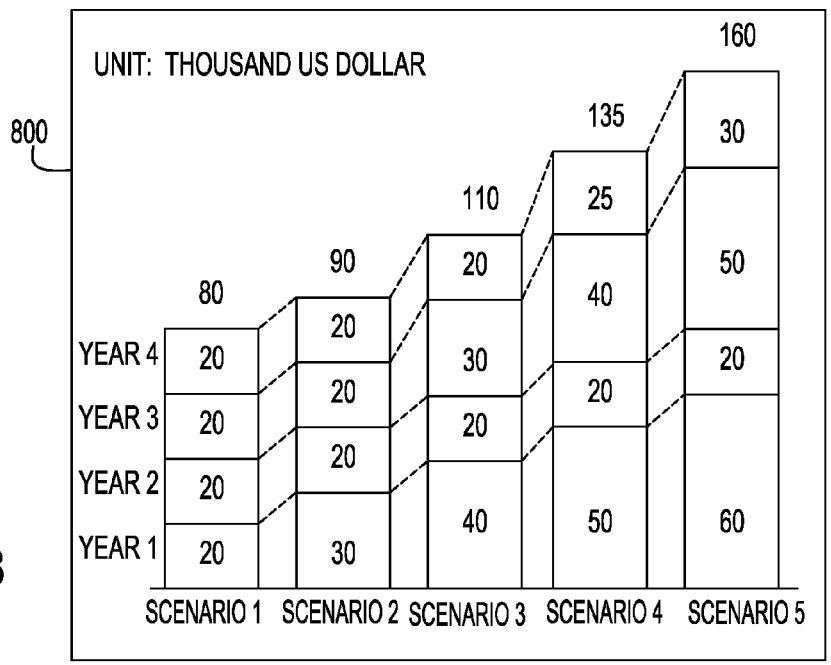
FIG. 8 illustrates a what-if-scenario-analysis example.

FIG. 8 shows a result of what-if scenario analysis, that is, bill schedule of different scenarios. A scenario is a model of a hypothetical pricing model and corresponding parameters. After a scenario is defined by, for example, the scenario editor 708 shown in FIG. 7, what if analysis or scenario analysis simulates the system to find possible effect of these scenarios, and generates report 800 shown in FIG. 8 to compare the price over a period of time, for example, years, for different scenarios.

A sensitivity analysis can be a meaningful addition to a business case, since it examines the influence of individual parameters on the overall result. FIG. 9 shows an example of sensitivity analysis used to determine the effect on the overall result by changing one variable at a time to understand uncertainty in any type of financial model and to identify critical inputs of the financial model and how their variability impacts the result. Sensitivity analysis can describe the impact of one metrics (cause) on the final financial results and ranks all the selected metrics. If a metric takes a different value, the analysis captures how many percentages another metric, for instance, revenue, will be changed. The parameters and rate of change shown at 902 may correspond to the user input, for instance, obtained at step 206 of FIG. 2, and detailed information obtained, for example, via user interface, shown in FIG. 4. An example of sensitivity analysis diagram is shown at 904. Referring to the first metric "Num. of transaction" shown in FIG. 9 as an example, when Num. of transaction=1.75 million, the revenue will be 10 million UDS. However when Num. of transaction is 2.5 million (the maximal value), the revenue will increase 100%, that is 20 million USD. Similarly, when Num. of transaction=1 million (the minimal value), the revenue will reduce 101%.

Due to the complexity and uncertainty in real systems, simulation is often helpful in handling complex decisions. For example, Monte Carlo simulation can be used to determine the effect of changing all the variables at the same time while introducing probability distributions for each variable. Monte Carlo simulation is known method often used when the model is complex, nonlinear, or involves more than just a couple uncertain parameters. Briefly and generally, Monte Carlo simulation uses the following steps:

Step 1: Get the composite pricing model $y=f(x1, x2, \ldots, xq)$, $x1, x2, \ldots, xq$ are the parameters;

Step 2: Generate a set of random inputs, $xi1, xi2, \ldots, xiq$;

Step 3: Evaluate the model and store the results as $yi$;

Step 4: Repeat steps 2 and 3 for $i=1$ to n, n is the total number of simples/evaluations;

Step 5: Analyze the results using histograms, summary statistics, confidence intervals, etc. such as the diagram shown at 1006 in FIG. 10.

Figure 10:
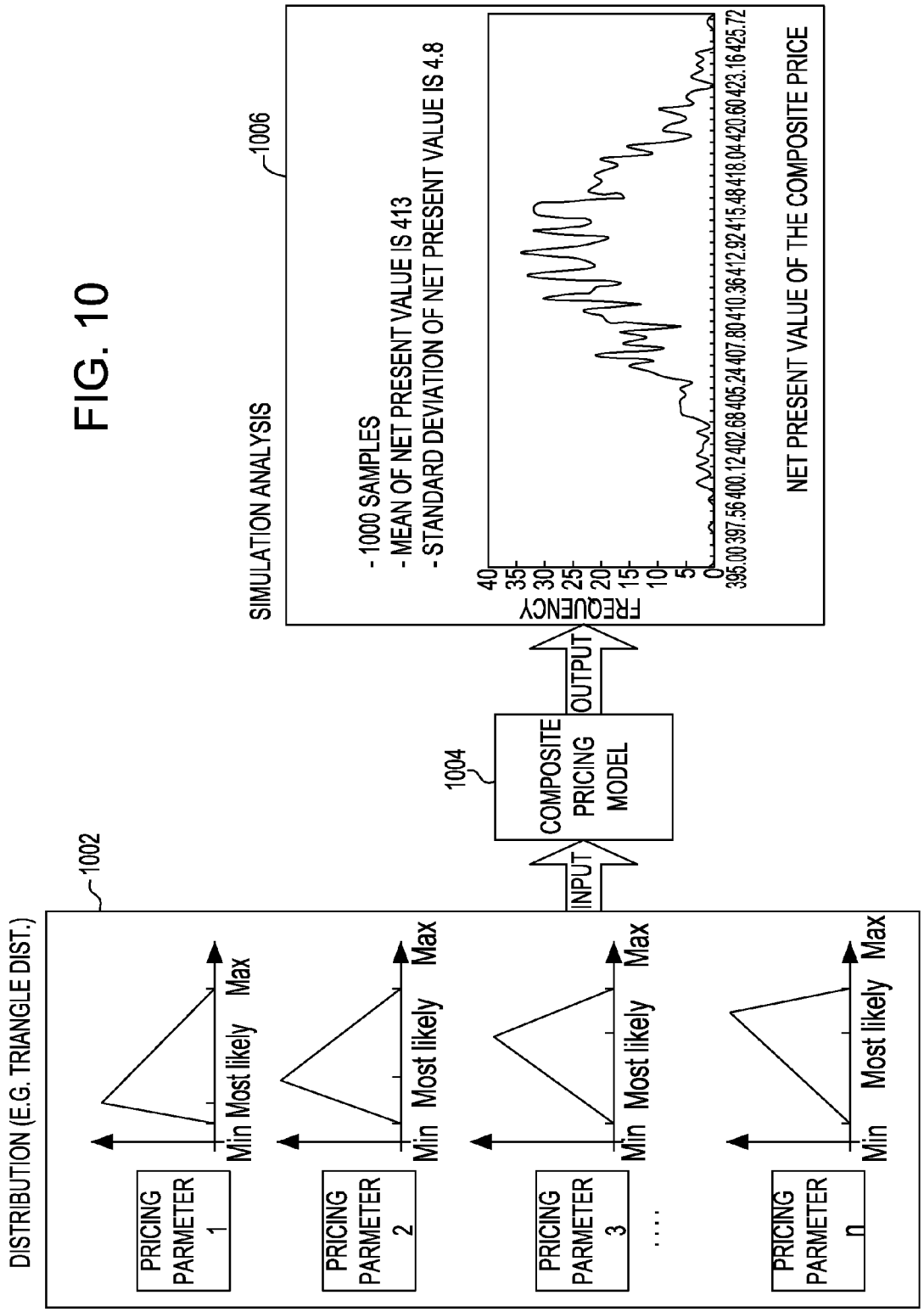
FIG. 10 shows simulation analysis example.

FIG. 10 shows an example of simulation analysis. The Monte Carlo simulation generates a set of random inputs, for example, randomly generated parameters and their distribution. In the example shown in FIG. 10, the triangle distribution is used for random number generation. Other methods of generating random numbers to represent uncertainty may be used. For simulation analysis, parameters of pricing model with distribution 1002 are input. By using random inputs, the deterministic model is being converted into a stochastic model. Parameters and their distribution 1002 randomly generated are input to a composite pricing model 1004. An example of the composite model 1004 is the model determined in the pricing optimizer shown at 122 in FIG. 1. The statistics of simulation result can be shown in a diagram 1006 or like. The X-axis shows the metric value. The Y-axis is frequency, which calculates how often values occur in the 1000 samples that are within a range of the metric values, that is, count of the number of scores that fall within ranges of metrics value.

The method of the present disclosure in one embodiment may be embodied as a program, software, or computer instructions embodied in a computer or machine usable or readable medium, which causes the computer or machine to perform the steps of the method when executed on the computer, processor, and/or machine.

The system and method of the present disclosure may be implemented and run on a general-purpose computer or computer system and/or special computer or computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims. For example, while the above-description referred to pricing of services and using service pricing models, it should be understood that the method and system of the present disclosure may apply to determining pricing other than of services, for example, of goods or products, for instance, utilizing pricing models associated with pricing of goods and products and associated parameters and values.

We claim:

1. A computer-implemented method for composite pricing, comprising:
   establishing a plurality of elementary pricing models and one or more pricing parameters, at least one of the plurality of elementary pricing models including a value-based pricing model, which sets a price as a function of an expected value to be derived to a customer;
   automatically selecting by a processor two or more elementary pricing models, including a variable fee and a fixed fee, from the plurality of elementary pricing models based on user selected solution;
   automatically estimating whether to use said one or more pricing parameters;
   constructing by a processor a composite pricing model based on said two or more elementary pricing models and said one or more pricing parameters;
   optimizing the composite pricing model to minimize risk and maximize one or more selected criteria, the optimizing including determining proportions of said selected two or more elementary pricing models to be utilized in the composite pricing model; and
   generating a price utilizing the optimized composite pricing model,
   wherein a two stage pricing model solves a pricing problem reversely, a first stage determining a proportion of the variable fee including at least a performance fee, a benefit fee and a usage fee that minimizes total risk of the variable fee, a second stage determining a proportion of the fixed fee and the variable fee based on customers' satisfaction and providers' risk affordance, the total risk of the variable fee determined as $$\min\left(\frac{p}{m_p}\right)^2 \sigma_p^2 + \left(\frac{b}{m_b}\right)^2 \sigma_b^2 + \left(\frac{u}{m_u}\right)^2 \sigma_u^2$$
$$s.t.\ p+b+u=1$$

wherein,
a proportion of the performance fee, benefit fee and usage fee is p, b, u respectively, and
a mean and a standard deviation of data of the performance fee, benefit fee and usage fee is $m_p$, $m_b$, $m_u$ and $\sigma_p$, $\sigma_b$, $\sigma_u$, respectively.

2. The method of claim 1, further including:
enabling analysis of one or more attributes associated with the price.

3. The method of claim 2, wherein the analysis includes business case analysis.

4. The method of claim 2, wherein the analysis includes sensitivity analysis.

5. The method of claim 4, wherein the step of enabling analysis includes:
determining effect on the price by changing said one or more pricing parameters one at a time.

6. The method of claim 4, wherein the step of enabling analysis includes:
determining uncertainty in the composite pricing model.

7. The method of claim 4, wherein the step of enabling analysis includes:
identifying one or more attributes that impact said one or more pricing parameters.

8. The method of claim 2, wherein the step of enabling analysis includes determining effect of changing said one or more pricing parameters simultaneously while introducing probability distributions for each of the variables.

9. The method of claim 8, further including utilizing Monte Carlo simulation.

10. The method of claim 1, wherein the step of constructing includes utilizing an asset repository and one or more templates.

11. The method of claim 10, wherein said one or more templates include information associated with one or more elementary pricing models associated with a selected solution.

12. The method of claim 1, wherein the step of generating a price includes generating a payment schedule over a predetermined time period.

13. The method of claim 1, wherein the step of automatically estimating whether to use said one or more pricing parameters includes determining one or more pricing parameters to use based on a significance estimation algorithm.

14. The method of claim 1, further including receiving user selected one or more elementary pricing models and one or more pricing parameters.

15. The method of claim 1, wherein the step of establishing a plurality of elementary pricing models and one or more pricing parameters further includes determining one or more elementary pricing models and one or more pricing parameters to use based on historical data, available data, knowledge base, or combinations thereof.

16. The method of claim 1, wherein said price includes price for services, price for goods, or combination thereof.

17. A system for providing composite pricing, comprising:
a processor;
an asset repository providing information associated with a plurality of elementary pricing models and one or more pricing parameters associated with said elementary pricing models;
a pricing model selection module operable to select two or more elementary pricing models, including a variable fee and a fixed fee, based on one or more project criteria and said information in the asset repository and user provided solution information, and to build a composite pricing model, at least one of the plurality of elementary pricing models including a value-based pricing model, which sets a price as a function of an expected value to be derived to a customer;
a quantifiable metrics selection module executable on the processor and operable to select one or more parameters associated with said selected two or more elementary pricing models used in the composite pricing model, the quantifiable metrics selection module further operable to suggest whether to use one or more parameters based on an estimation algorithm for determining significance of a parameter; and
a pricing optimizer module operable to optimize the composite pricing model to minimize risk and maximize one or more selected criteria and to generate a price utilizing the composite pricing model, wherein the pricing optimizer module determines proportions of said selected two or more elementary pricing models to be utilized in the composite pricing model,
wherein a two stage pricing model solves a pricing problem reversely, a first stage determining a proportion of the variable fee including at least a performance fee, a benefit fee and a usage fee that minimizes total risk of the variable fee, a second stage determining a proportion of the fixed fee and the variable fee based on customers' satisfaction and providers' risk affordance, the total risk of the variable fee determined as $$\min\left(\frac{p}{m_p}\right)^2 \sigma_p^2 + \left(\frac{b}{m_b}\right)^2 \sigma_b^2 + \left(\frac{u}{m_u}\right)^2 \sigma_u^2$$
$$s.t. \quad p+b+u=1$$

wherein,
a proportion of the performance fee, benefit fee and usage fee is p, b, u respectively, and
a mean and a standard deviation of data of the performance fee, benefit fee and usage fee is $m_p$, $m_b$, $m_u$ and $\sigma_p$, $\sigma_b$, $\sigma_u$, respectively.

18. The system of claim 17, further including:
a pricing analyzer module operable to enable analysis of one or more attributes associated with the price.

19. The system of claim 18, wherein said pricing analyzer module enables business case analysis, sensitivity analysis, determining effect on the price by changing said one or more pricing parameters one at a time, determining uncertainty in the composite pricing model, identifying one or more attributes that impact said one or more pricing parameters, or determining effect of changing said one or more pricing parameters simultaneously while introducing probability distributions for each of the one or more pricing parameters, or combinations thereof.

20. The system of claim 17, further including:
a template database comprising templates associated with one or more business solutions, said templates including information associated with a plurality of elementary pricing models and default parameter values associated with said plurality of elementary pricing models, wherein said pricing model selection modules uses one or more templates associated for building the composite pricing model.

21. The system of claim 17, wherein the quantifiable metrics selection module is further operable to select one or more parameters based on a significance estimation algorithm.

22. A non-transitory program storage device readable by a machine, tangibly embodying a program of instructions executable by the machine to perform a method of composite pricing, comprising:
establishing a plurality of elementary pricing models and one or more pricing parameters, at least one of the plurality of elementary pricing models including a value-based pricing model, which sets a price as a function of an expected value to be derived to a customer;
automatically selecting two or more elementary pricing models, including a variable fee and a fixed fee, from the plurality of elementary pricing models based on user selected solution;
automatically estimating whether to use said one or more pricing parameters;
constructing a composite pricing model based on said two or more elementary pricing models and said one or more pricing parameters;
optimizing the composite pricing model to minimize risk and maximize one or more selected criteria, the optimizing including determining proportions of said selected two or more elementary pricing models to be utilized in the composite pricing model; and
generating a price utilizing the optimized composite pricing model,
wherein a two stage pricing model solves a pricing problem reversely, a first stage determining a proportion of the variable fee including at least a performance fee, a benefit fee and a usage fee that minimizes total risk of the variable fee, a second stage determining a proportion of the fixed fee and the variable fee based on customers' satisfaction and providers' risk affordance, the total risk of the variable fee determined as $$\min\left(\frac{p}{m_p}\right)^2 \sigma_p^2 + \left(\frac{b}{m_b}\right)^2 \sigma_b^2 + \left(\frac{u}{m_u}\right)^2 \sigma_u^2$$
$$s.t. \quad p+b+u=1$$

wherein,
a proportion of the performance fee, benefit fee and usage fee is p, b, u respectively, and
a mean and a standard deviation of data of the performance fee, benefit fee and usage fee is $m_p$, $m_b$, $m_u$ and $\sigma_p$, $\sigma_b$, $\sigma_u$, respectively.

23. The program storage device of claim 22, further including:
enabling analysis of one or more attributes associated with the price.

24. The program storage device of claim 22, wherein the step of constructing includes utilizing an asset repository and one or more templates, said one or more templates including information associated with one or more elementary pricing models associated with a selected solution.

25. The program storage device of claim 22, wherein the price includes price for services, price for goods, or combination thereof.

* * * * *